US008606672B2

(12) United States Patent (10) Patent No.: US 8,606,672 B2
Varma et al. (45) Date of Patent: Dec. 10, 2013

(54) METHOD AND SYSTEM FOR ANALYZING INVESTMENT INFORMATION

(75) Inventors: Samir Varma, Greenwich, CT (US); Michael Wayne Shore, Dallas, TX (US)

(73) Assignee: Reconstructor Holdings LLC, Greenwich, CT (US)

( * ) Notice: Subject to any disclaimer, the term of this patent is extended or adjusted under 35 U.S.C. 154(b) by 40 days.

(21) Appl. No.: 13/288,660

(22) Filed: Nov. 3, 2011

(65) Prior Publication Data

US 2012/0116996 A1 May 10, 2012

Related U.S. Application Data

(60) Provisional application No. 61/410,237, filed on Nov. 4, 2010.

(51) Int. Cl.
*G06Q 40/00* (2012.01)
(52) U.S. Cl.
USPC ............................................. 705/35; 705/37
(58) Field of Classification Search
USPC .................................................... 705/35–45
See application file for complete search history.

(56) References Cited

U.S. PATENT DOCUMENTS 6,349,291 B1 2/2002 Varma

OTHER PUBLICATIONS

SAS Institute User Guide.*
Statistical Analysis of AKS, Ak Steel Holding Corp, © RiskPic.com, Sep. 22, 2010, 18 pages.

* cited by examiner

*Primary Examiner* — Richard C Weisberger
(74) *Attorney, Agent, or Firm* — Oblon, Spivak, McClelland, Maier & Neustadt, L.L.P.

(57) ABSTRACT

An information processing apparatus and associated method for analyzing investment information. An input unit receives a financial request and one or more investment variables relating to the financial indicator and a description vector unit generates at least two vectors containing the one or more investment variables based on the financial request. A description vector similarity unit then calculates a similarity value by comparing the at least two vectors and an investment analysis unit analyzes the similarity value and the financial request, and determines investment advice based on results of the analysis.

18 Claims, 5 Drawing Sheets

METHOD AND SYSTEM FOR ANALYZING INVESTMENT INFORMATION

CROSS REFERENCE TO RELATED APPLICATIONS

This Application is based upon and claims the benefit of priority from the U.S. Provisional Application No. 61/410,237, filed on Nov. 4, 2010; the entire contents of which are incorporated herein by reference.

FIELD

The embodiments discussed herein relate to a method and system for analyzing investment information. More specifically, a method and system that provides investment advice and comparisons of investment information based on an analysis of financial information is described.

BACKGROUND

Financial markets, such as the stock market, provide a vehicle for consumers to make financial investments with the hope of monetary gain. For example, stocks of a corporation purchased by a consumer can provide monetary gains for the consumer if the stock value increases over time. Before making an investment in the stock market, a consumer should undertake a considerable amount of time to research the investment. However, consumers are easily overwhelmed by the amount of factors that can be taken into account when attempting to make a smart investment decision and may only wish to focus on customized factors that are most relevant to a consumer's portfolio needs. Further, it is difficult for consumers to determine the risk and reward levels of various investments as well as the similarity and/or differences between various investments based on these factors.

Financial markets can also be extremely volatile which can result in sudden losses with respect to a consumer's investment. This sudden loss can cause the consumer to dispose of the investment regardless of potential future gains. For example, a consumer may notice a sudden drop in a stock price and proceed to sell the stock to avoid further losses. However, the stock price over a longer period of time may show a significant increase thereby resulting in a missed opportunity by the consumer for long-term monetary gain.

A need exists for a method and system for analyzing investment information that allows a consumer to generate customized investment analysis and advice based on a variety of factors identified by the consumer. Further, a need exists for providing risk and reward information as well as comparison information between investments based on the above-noted factors in a way that intelligently informs a consumer of investment value in the past, present and into the future.

SUMMARY

In order to solve at least the above-noted problems, the present advancement relates to information processing apparatus and associated method for analyzing investment information relating to a financial indicator. An input unit receives a financial request and one or more investment variables relating to the financial indicator and a description vector unit generates at least two vectors containing the one or more investment variables based on the financial request. A description vector similarity unit then calculates a similarity value by comparing the at least two vectors and an investment analysis unit analyzes the similarity value and the financial request, and determines investment advice based on results of the analysis.

BRIEF DESCRIPTION OF THE DRAWINGS

A more complete appreciation of the present advancements and many of the attendant advantages thereof will be readily obtained as the same becomes better understood by reference to the following detailed description when considered in connection with the accompanying drawings. However, the accompanying drawings and their exemplary depictions do not in any way limit the scope of the advancements embraced by this specification. The scope of the advancements embraced by the specification and drawings are defined by the words of the accompanying claims.

DETAILED DESCRIPTION

In the following, the present advancement will be discussed by describing a preferred embodiment with reference to the accompanying drawings. However, those skilled in the art will realize other applications and modifications within the scope of the disclosure as defined in the enclosed claims.

In embodiments, any desired network configuration, hardware, programming architecture, or a combination of both may be used to implement a system for analyzing investment information.

Figure 1:
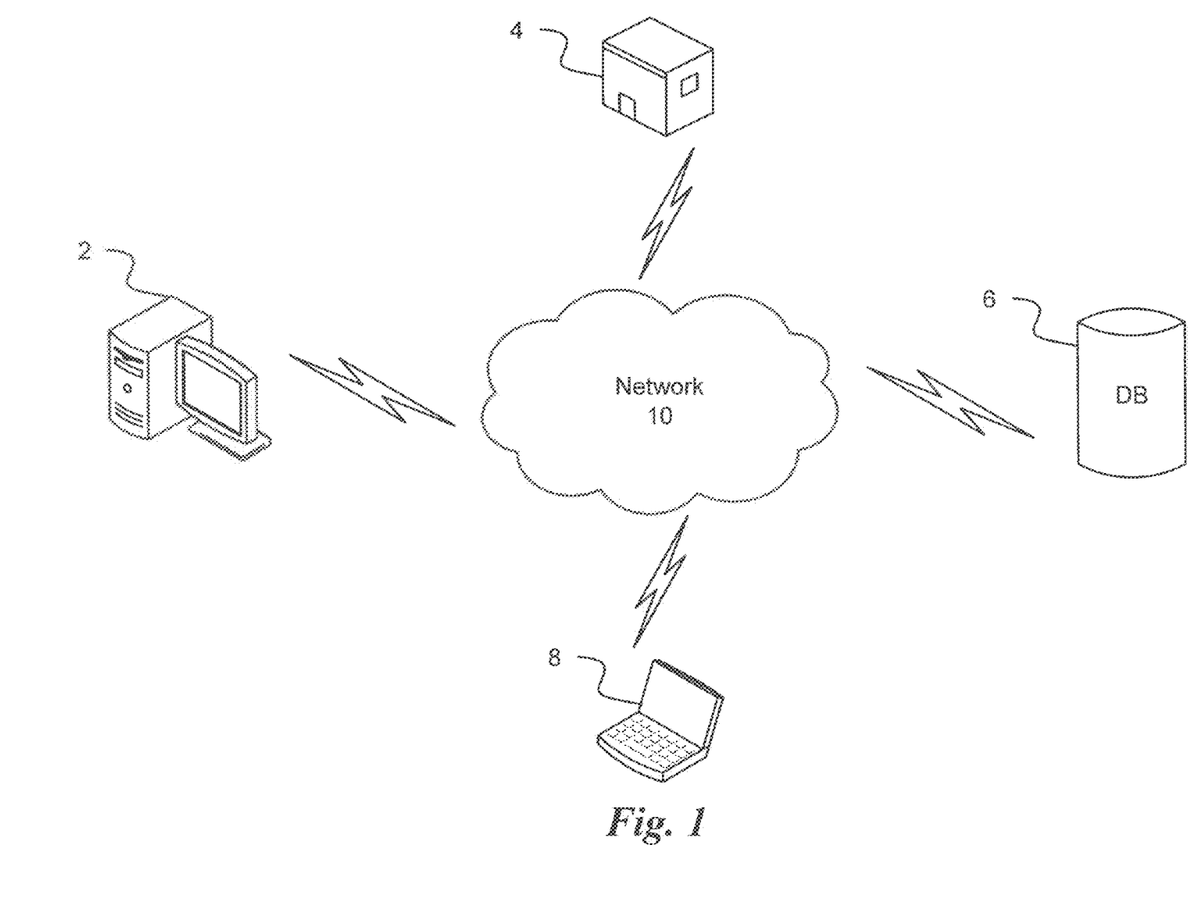
FIG. 1 is a schematic diagram of a system for analyzing investment information according to an exemplary embodiment of the present advancement.

FIG. 1 is a schematic diagram of a system for analyzing investment information according to an exemplary embodiment of the present advancement. In FIG. 1, a computer 2 is connected to a server 4, a database 6 and a mobile device 8 via a network 10. The server 4 represents one or more servers connected to the computer 2, the database 6 and the mobile device 8 via the network 10. The database 6 represents one or more databases connected to the computer 2, the server 4 and the mobile device 8 via network 10. The mobile device 8 represents one or more mobile devices connected to the computer 2, the server 4 and the database 6 via the network 10. The network 10 represents one or more networks, such as the Internet, connecting the computer 2, the server 4, the database 6 and the mobile device 8.

The server 4, the computer 6 and/or the mobile device 8 can be utilized as a central hosting site for the investment analysis system. Users of the computer 6 and mobile device 8 can also access the investment analysis system on the server 4 via network 10. Accordingly, the server 4 may notify users of the investment information through the network 10 to the computer 6 or mobile device 8.

Figure 2:
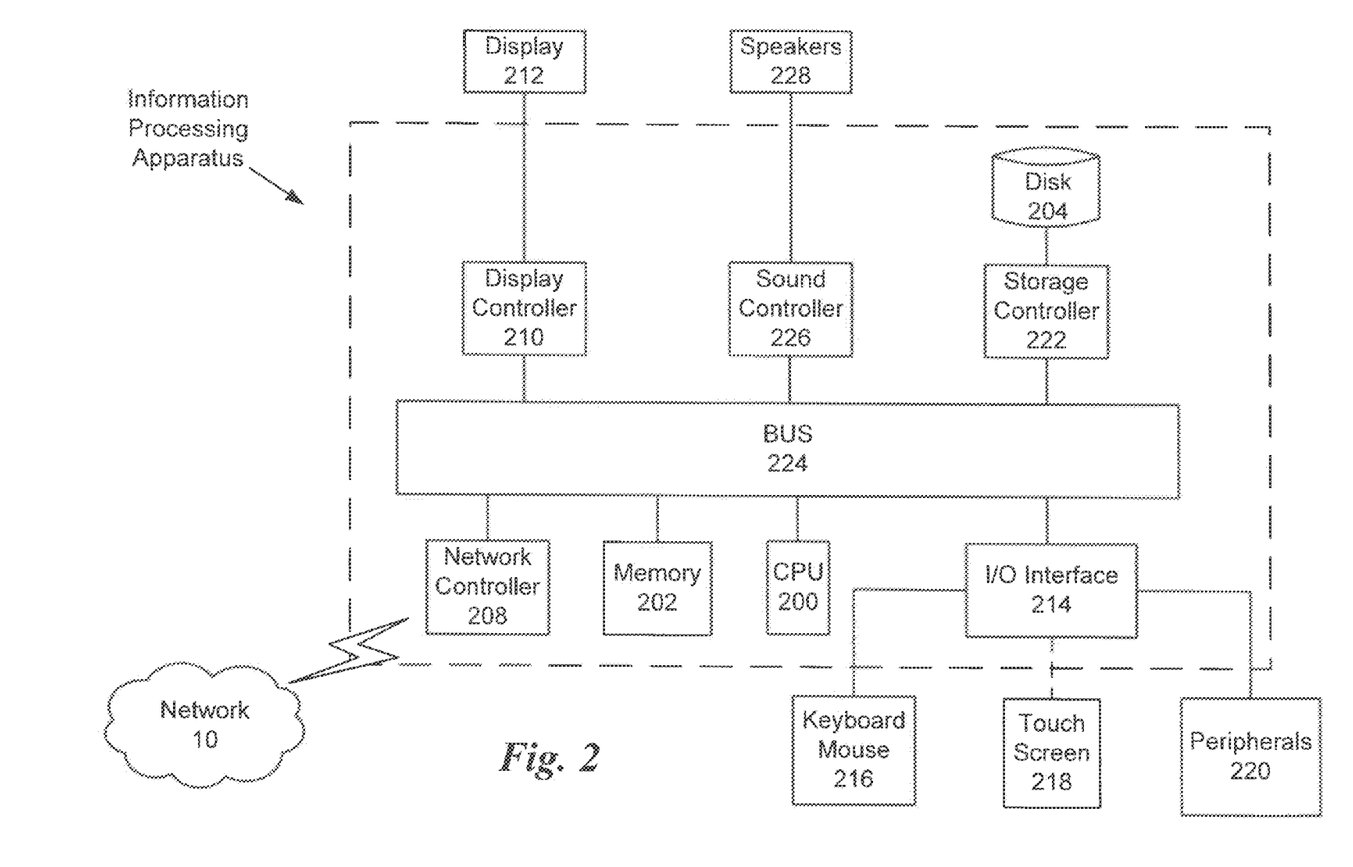
FIG. 2 is a schematic diagram of an information processing apparatus according to an exemplary embodiment of the present advancement.

Next, a hardware description of the information processing apparatus for analyzing investment information according to exemplary embodiments is described with reference to FIG. 2. In FIG. 2, the information processing apparatus includes a CPU 200 which performs the processes described above. The process data and instructions may be stored in memory 202. These processes and instructions may also be stored on a storage medium disk 204 such as a hard drive (HDD) or portable storage medium or may be stored remotely. Further, the claimed advancements are not limited by the form of the computer-readable media on which the instructions of the inventive process are stored. For example, the instructions may be stored on CDs, BLU-RAY, DVDs, in FLASH memory, RAM, ROM, PROM, EPROM, EEPROM, hard disk or any other information processing device with which the information processing device communicates, such as a server or computer.

Further, the claimed advancements may be provided as a utility application, background daemon, or component of an operating system, or combination thereof, executing in conjunction with CPU 200 and an operating system such as Microsoft Windows 7, UNIX, Solaris, LINUX, Apple MAC-OS and other systems known to those skilled in the art.

CPU 200 may be a Xenon or Core processor from Intel of America or an Opteron processor from AMD of America, or may be other processor types that would be recognized by one of ordinary skill in the art. Alternatively, the CPU 200 may be implemented on an FPGA, ASIC, PLD or using discrete logic circuits, as one of ordinary skill in the art would recognize. Further, CPU 200 may be implemented as multiple processors cooperatively working in parallel to perform the instructions of the inventive processes described above.

The information processing apparatus in FIG. 2 also includes a network controller 208, such as an Intel Ethernet PRO network interface card from Intel Corporation of America, for interfacing with network 10. As can be appreciated, the network 10 can be a public network, such as the Internet, or a private network such as an LAN or WAN network, or any combination thereof and can also include PSTN or ISDN sub-networks. The network 10 can also be wired, such as an Ethernet network, or can be wireless such as a cellular network including EDGE, 3G and 4G wireless cellular systems. The wireless network can also be WiFi, Bluetooth, or any other wireless form of communication that is known.

The information processing apparatus further includes a display controller 210, such as an NVIDIA GeForce GTX or Quadro graphics adaptor from NVIDIA Corporation of America for interfacing with display 212, such as a Hewlett Packard HPL2445w LCD monitor. A general purpose I/O interface 214 interfaces with a keyboard and/or mouse 216 as well as a touch screen panel 218 on or separate from display 212. General purpose I/O interface also connects to a variety of peripherals 220 including printers and scanners, such as an OfficeJet or DeskJet from Hewlett Packard.

A sound controller 226 is also provided in the information processing apparatus, such as Sound Blaster X-Fi Titanium from Creative, to interface with speakers/microphone 228 thereby providing sounds and/or music.

The general purpose storage controller 222 connects the storage medium disk 204 with communication bus 224, which may be an ISA, EISA, VESA, PCI, or similar, for interconnecting all of the components of the information processing apparatus. A description of the general features and functionality of the display 212, keyboard and/or mouse 216, as well as the display controller 210, storage controller 222, network controller 208, sound controller 226, and general purpose I/O interface 214 is omitted herein for brevity as these features are known.

Figure 3:
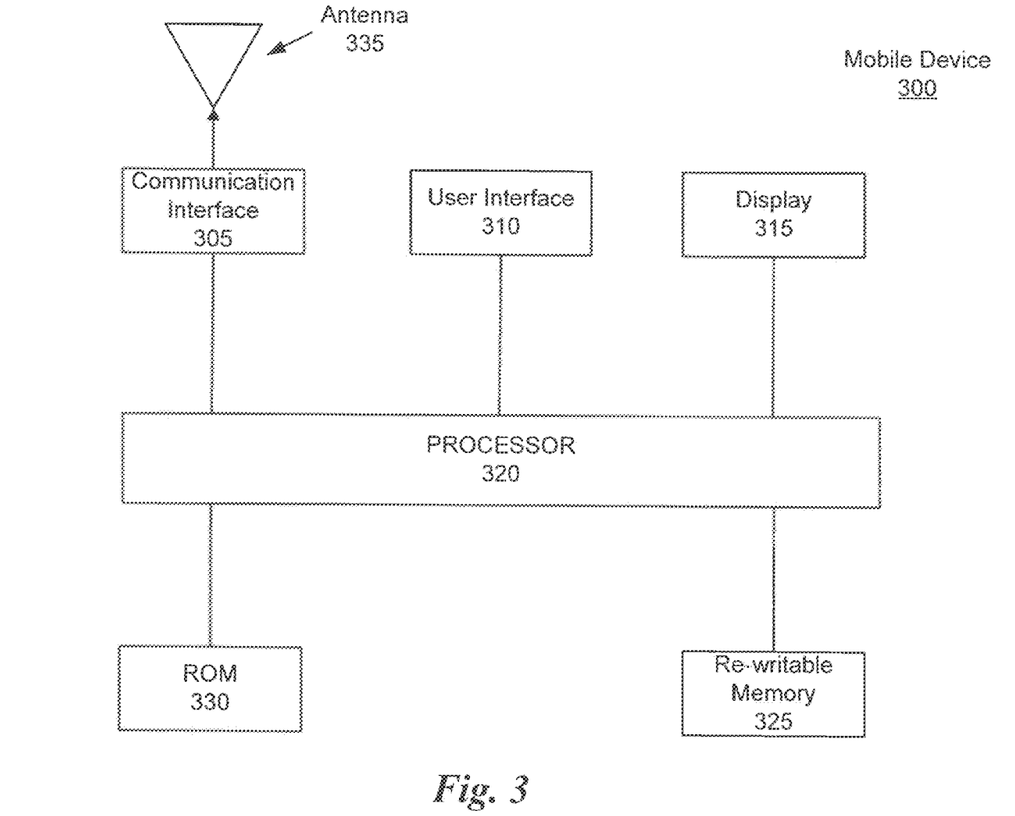
FIG. 3 is a schematic drawing of a mobile device according to an exemplary embodiment of the present advancement.

FIG. 3 is a block diagram of the mobile device 8. The mobile device 8, which may be a smart phone such as an iPhone from Apple, Inc. of America, includes a processor 320 used to control the functions of the mobile device 8 and to run applications thereon, such as an electronic address book, interne browser, etc. Processor 320 may be an ARM processor or a processor such as a Core 2 Duo from Intel Corporation of America. Alternatively, Processor 320 may be implemented on an FPGA, ASIC or using discrete logic circuits, as would be recognized by one of ordinary skill in the art.

A user interface 310, which may include a microphone, speaker, touch screen, keyboard or any combination thereof, allows the processor 320 to receive input from a user of the mobile device 300, and a display 315 provides feedback to the user. Display 315 may be a color or monochrome LCD display or any other display that would be recognized by one of ordinary skill in the art.

Mobile device 8 also includes a communication interface 305 and antenna 335 to communicate with other devices, such as the server 4 or another mobile device 8. Further, mobile device 8 may communicate with these other devices wirelessly using the cellular network (including EDGE, 3G, 4G, etc.,) a WiFi connection, a Bluetooth connection or any other wireless form of communication that is known. Mobile device 8 may also communicate through a wired connection to communication interface 305, such as a USB connection.

In some embodiments, mobile device 8 includes read-only memory, ROM 330, to store low-level functions and processes necessary to support core functionality, and re-writable memory 325, which stores an operating system, drivers, applications, application data and user data. Re-writable memory 325 may be dynamic or static random access memory (RAM), FLASH memory, EEPROM memory, and the like. Further, portions of the re-writable memory 325 may be removable.

For example, re-writable memory 325 may store an application for communicating with server 4 to identify mobile device 8 and to provide the server 4 with access to data stored therein. Such application may be downloaded, via any of the communication methods described above, from the server 4, from a software repository or from an online store, such as the App Store from Apple, Inc. of America. Further, such an application may be an electronic address book, or electronic personal information manager (PIM). However, the application may also be a plug-in for an electronic address book or PIM already installed on mobile device 8, a background application, driver and the like.

As one of skill in the art would recognize, the above descriptions of the server 4 and mobile device 8 are merely examples and other server configurations and mobile devices may be used without departing from the scope of the present advancements.

According to some embodiments, a "module" refers to hardware architecture or one or more programming architectures, or a combination of both, configured to perform one or more designated functions.

Figure 4:
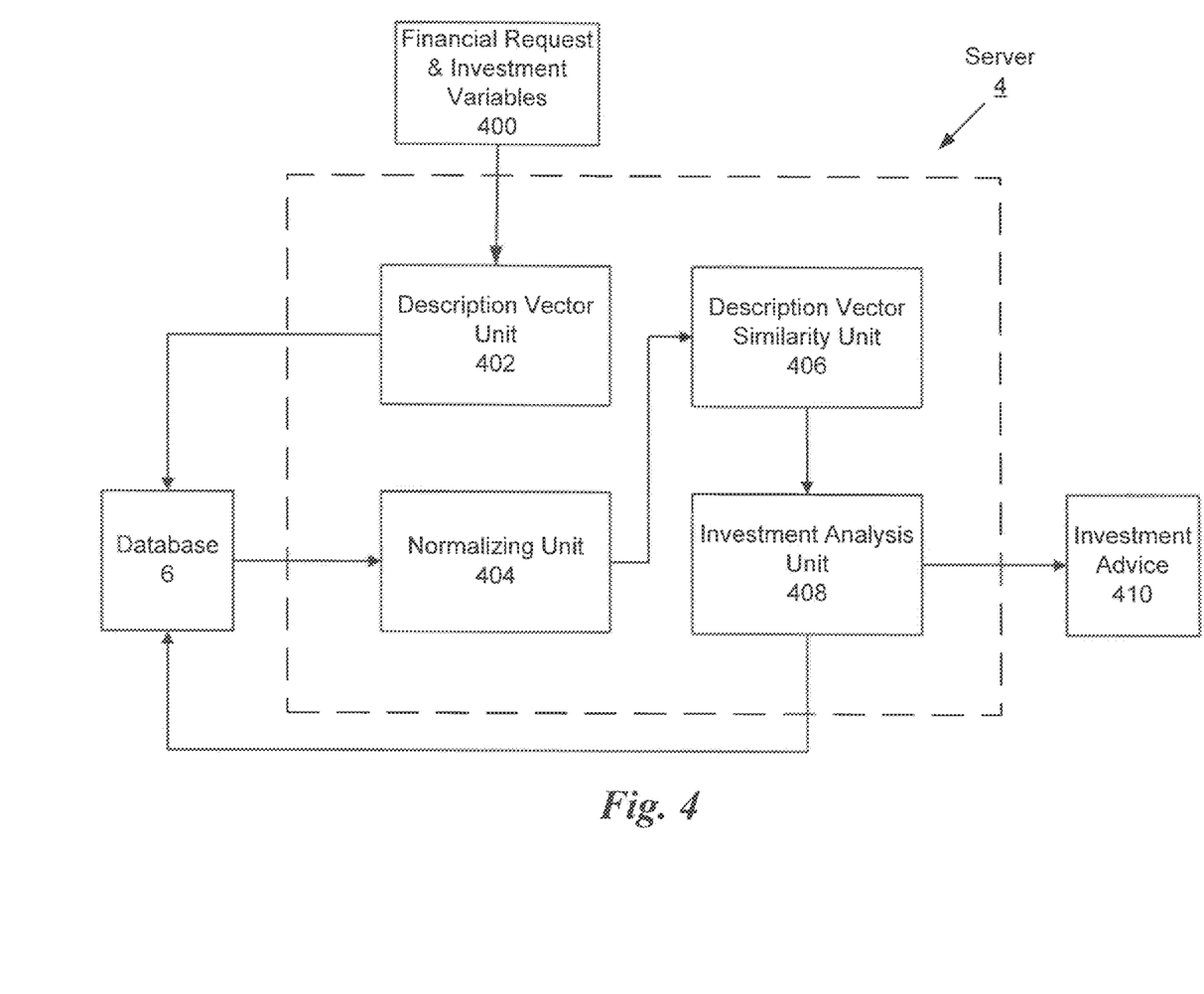
FIG. 4 is a functional drawing of the investment analysis system according to an exemplary embodiment of the present advancement.

FIG. 4 describes the functionality of the investment analysis system according to one embodiment of the present advancement. FIG. 4 illustrates investment variables and a financial request 400, the database 6, the server 4, the investment advice 410, a description vector unit 402, normalizing unit 404, description vector similarity unit 406 and an investment analysis unit 408. The description vector unit 402, normalizing unit 404, description vector similarity unit 406 and an investment analysis unit 408 are illustrated within the server 4 but in other embodiments could be included within the computer 6 or the mobile device 8. Investment variables and a financial request 400 relating to an investment, or financial indicator, are received from a user depending on the investment information the user wants to obtain. Example investment variables 400 include P/E rations, debt to equity, total sales, and temporal resampled risk. The financial request represents a request from the user to obtain certain financial information. A variety of non-limiting examples of financial requests are described in detail later. The investment variables and financial request 400 are then transmitted to the server 4 via the network 10 as described in FIG. 1.

The description vector unit 402 of the server 4 defines a description vector based on the investment variables and the financial request 400. The description vector can represent a multidimensional point in multidimensional space and contains the investment variables 400. The description vector defines what type of investment information, such as risk or reward information, the user is seeking to obtain for his or her portfolio needs. More information with respect to the description vector is provided later with respect to FIGS. 5 and 6.

The normalizing unit 404 of the server 4 normalizes all of the investment variables 400 of the description vector defined by the description vector unit 402. Normalization is required so that all of the investment variables 400 have an equal weight with respect to each other when investment calculations are performed. One type of normalization is 1/N, where N is the number of investment variables 400. Another type of normalization is to use the standard deviation of all the information in database 6. For this type of normalization, the information analyzing system calculates the standard deviation for each investment variable 400 contained in the database 6 and then divides the investment variable 400 of the particular investment by the standard deviation. For example, if the user selects IBM as a particular investment and chooses the P/E Ratio as one of the investment variables 400, the investment analysis system locates all of the P/E Ratios in the database 6, calculates the standard deviation, and then divides the P/E Ratio of IBM by the standard deviation to obtain a normalized value.

The present advancement, however, does not require the input investment variables to be equally weighted. As long as the sum of all the normalization weights is 1, different investment variables 400 could have different weights. Any additional description vector being compared to the description vector defined by the description vector unit 204 would also have to be normalized to keep calculations consistent. More information with respect to the normalizing unit 404 is provided later with respect to FIG. 5.

The description vector similarity unit 406 calculates the similarities between description vectors created by the description vector unit 402 and normalized by the normalizing unit 404. As described later, at least one way to determine the similarity between description vectors is to calculate the Euclidean distance between the description vectors. However, another metric for determining the similarity is to use an absolute value metric or any other metric defined by the user of the investment analysis system. The results of the description vectors similarity unit are then transmitted to the investment analysis unit 408.

The investment analysis unit 408 analyzes the results of the description vector similarity unit 406 to provide the user with investment advice based on the investment variables and the financial request 400 defined by the user. To do this, the investment analysis unit 408 compares similarity information from the description vector similarity unit 406 based on what type of investment information the user is interested in obtaining for his or her portfolio. Non-limiting examples of investment information include a list of a best or worst investments, a comparison of investments, and risk and reward information. More information on the investment information determined by the investment analysis unit 408 is described later with respect to FIG. 5.

The investment advice 410 of the investment analysis unit 408 are provided to the database 6 to be stored for possible later analysis and are provided to the user via at least a computer 2 or mobile device 8 as described in FIG. 1.

Figure 5:
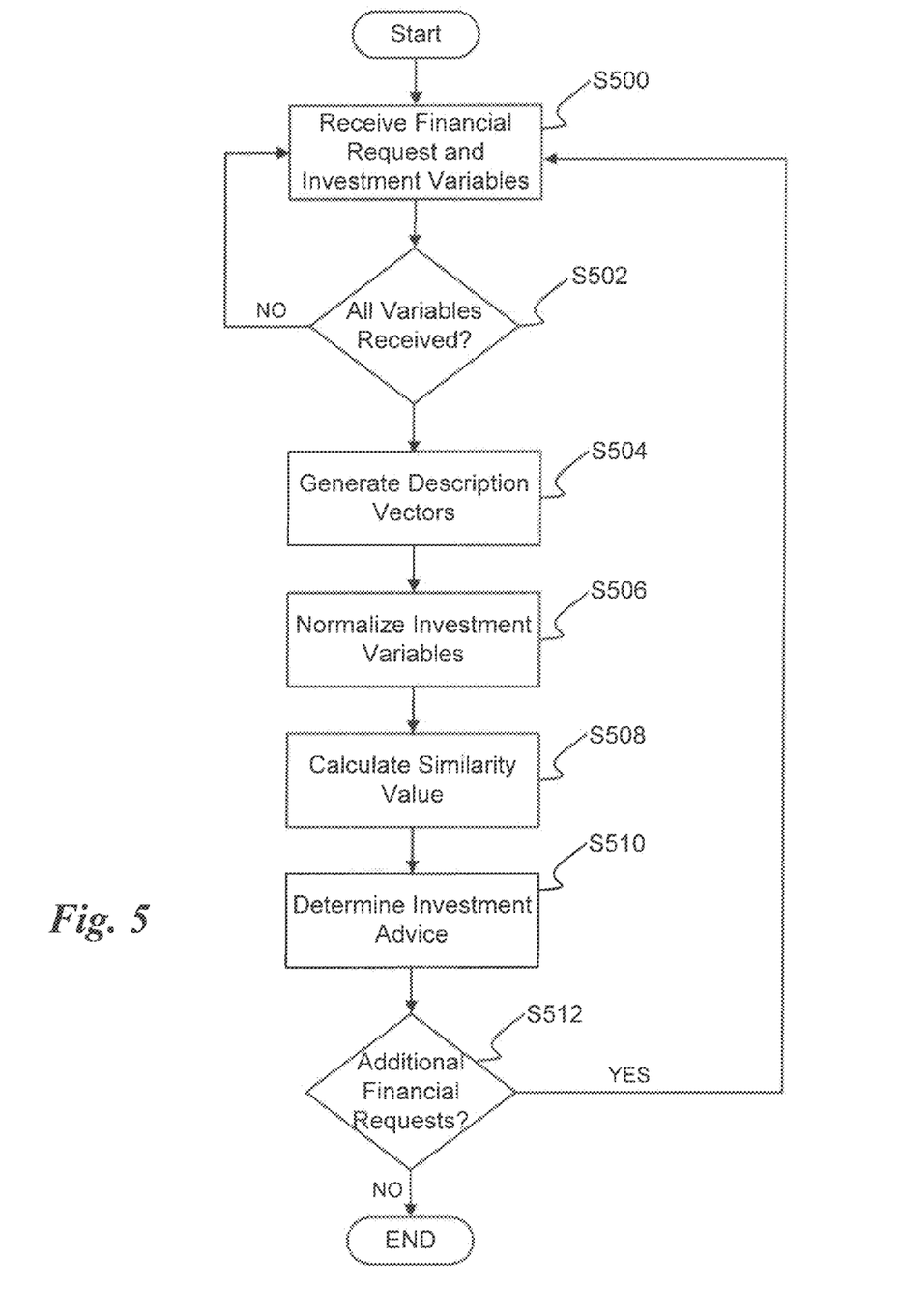
FIG. 5 is an algorithmic flow chart of analyzing investment information according to an exemplary embodiment of the present advancement.

FIG. 5 is a algorithmic flow chart of analyzing investment information according to an exemplary embodiment of the present advancement. The process of analyzing investment information starts at step S500 by having a user input a customized ranking of factors, or investment variables 400, relating to the investment (p/e ratios, debt to equity, etc), and a financial request 400. The system then determines whether all the variables have been received at step S502. If NO at step S502, the system continues to accept investment variables 400 until the user has finished. If YES at step S502, the system proceeds to step S504 to generate a description vector based on the investment variables and the financial request 400.

The description vector DV generated by the description vector unit 402 is defined as follows. DV=(s1, s2, s3, . . . , sn), where s1 through sn are investment variables 400 that describe an investment or benchmark in question. Therefore, if the user wanted to measure the risk of a single stock and determines that the most important factors are the p/e ratio, the 21 day resampled risk of the maximum drawdown exceeding 10%, and the Quick Ratio, then the description vector for this particular stock, i.e. for this particular calculation, would be an "Investment Risk Vector" defined as IRV= (p/e ratio, 21 day resampled risk of the maximum drawdown exceeding 10%, Quick Ratio). A corresponding "Benchmark Risk Vector" would be defined as BRV=(p/e ratio, 21 day resampled risk of the maximum drawdown exceeding 10%, Quick Ratio). While both vectors contain the same investment variables 400, the values of the investment variables 400 will likely be different based on the corresponding value of each investment variable 400 in the database 6 with respect to the investment or benchmark. Once the description vector is defined, the process proceeds to step S506 to normalize each of the investment variables 400.

The investment variables 400 must be normalized to ensure they each provide the appropriate amount of weight to the investment analysis calculations. For example, the absolute value of a p/e ratio is generally in the tens or twenties. The absolute value of a 21 day resampled risk, however, is between zero and 1. If the two variables were not normalized, then any future calculation would be almost entirely dominated by the p/e ratio.

One option is for the user to specify how to normalize each variable based on the user's needs. However, a natural, default, normalization for each piece of data is supplied for the ease of the user. As noted above, one such natural normalization is to use the standard deviation of all such pieces of information in the database 6. So, for example, if the user requested analysis on a particular stock, and the user's choices were the p/e ratio, the p/s ratio, and the chance of a 5 day maximum drawdown exceeding 5%, all the p/e ratios would be located in the database 6, their standard deviation would be calculated, and then that particular stock's p/e ratio would be divided by this standard deviation. Then all the p/s ratios would be located in the database 6, their standard deviation would be calculated, and this stock's p/s ratio would be divided by that standard deviation. This process is repeated until all the investment variables 400 of the description vector are normalized.

Returning to the description vector, non-limiting examples of the description vector include an Investment Risk Vector, Benchmark Risk Vector, Investment Reward Vector and an Benchmark Reward Vector. The description vector can also be any other vector chosen by the user. As such, the names "Benchmark Risk Vector", "Benchmark Reward Vector", "Investment Risk Vector" and "Investment Reward Vector" are for convenience and the user is free to specify any number of vectors with customized naming conventions so as to make whatever comparison the user sees fit between whatever instruments, portfolios or groups the user wants. The Investment Risk Vector IRisk is defined as follows. IRisk=(IRisk1, IRisk2, IRisk3, ..., IRiskn), where IRisk1 through IRiskn are the normalized investment variables 400 that describe the investment in question. For example, IRisk1=p/e ratio, IRisk2=21 day resampled risk, IRisk3=total sales of company/total sales in industry, etc, to IRiskn. Alternatively, IRisk1=5 day resampled risk of maximum drawdown >5%, IRisk2=chance of hitting a fixed stop loss of 3% over a one month period, etc, to IRiskn. The investment could be anything from an individual financial instrument such as a stock, to a group of financial instruments such as a group of stocks, to an entire investment portfolio made up of any number of financial instruments such as stocks, bonds, mutual funds, commodities, options, OTC derivatives, currencies, contingent claims, derivatives, balance sheet items, options, futures, exchange traded instruments, and over the counter instruments.

The Benchmark Risk Vector Brisk is defined as follows. BRisk=(BRisk 1, BRisk2, BRisk3, ..., BRiskn) where BRisk1 through BRiskn are the same investment variables 400 as IRisk1 through IRiskn, but for the Benchmark rather than the Investment if the Benchmark Risk Vector BRisk is used in comparison to the Investment Risk Vector. A Benchmark is a standard against which the performance of a security, mutual fund or investment manager can be measured. Generally, broad market and market-segment stock and bond indexes are used for this purpose. For example, the Benchmark could be a recognized benchmark like the S&P 500, it could be a sector index, it could be an ETF, or it could be some custom composite created by the user.

The Investment Reward Vector IReward is defined as follows. IReward=(IReward1, IReward2, IReward3, IRewardn), where the investment variables 400 are variables that the user thinks affect the expected return of the investment. The investment could be for a stock, a portfolio, or a mixed bag of various kinds of investments. It should be noted that the Investment Reward Vector should not be the same vector as Investment Risk Vector IRisk. The Investment Risk Vector IRisk represents what the user thinks of as the financial information that goes wrong, or might go wrong, or that which indicates an elevated level of risk. IReward represents that financial information which the user thinks might go right thereby providing a favorable return for the user.

The Benchmark Reward Vector is defined as follows. BReward=(BReward1, BReward2, BReward3, ..., BRewardn) where the investment variables 400 correspond to the investment variables 400 defined in the Investment Reward Vector IReward if the Benchmark and the Investment Reward Vector IReward are being compared. It should be noted that BReward represents the "ideal" investment according to the user. For example, if the user is a stock investor and is interested in value, the user may think the best kinds of investments are those where the p/e ratio is less than 10, the price/book is less than 1, the current ratio is greater than 1, and the profit margin is greater than 5%. Thus, the user would create a BReward with those four investment variables 400 and normalize the investment variables 400. A comparison of proposed investments to this "ideal" investment will be described later.

Returning to FIG. 5, after the investment variables 400 have been normalized at step S506, the similarities between the description vectors are calculated at step S508. There are different ways of defining a similarity between two description vectors. One option is to take the Euclidean distance between two multidimensional vectors generated by the description vector unit 402. This would be represented by, for example, ||IRisk−BRisk|| or ||IReward−BReward||, which represents taking each normalized investment variable 400 from each description vector generated by the description vector unit 402, subtract one from the other, square the result, sum them together, and take the square root. For example, to calculate the risk of an investment, the following calculation is performed: $(IRisk1-BRisk1)^2+(IRisk2-BRisk2)^2+(IRisk3-BRisk3)^2+ \ldots +(IRiskN-BRiskN)^2$. The square root of the resulting sum is then calculated to obtain the similarity value.

Another method of calculating the similarity is by using an absolute value similarity metric. Using the absolute value metric, each normalized investment variable from each description vector generated by the description vector unit 402 is subtracted from one another and the resultant values are added to obtain a distance between the description vectors. The absolute value of the distance is then determined to obtain a similarity value. For example, to calculate the risk of an investment, the following calculation is performed: $|(IRisk1-BRisk1)|+|(IRisk2-BRisk2)|+|(IRisk3-BRisk3)|+ \ldots +|(IRiskN-BRiskN)|$.

It should be noted that when more variables are added, the absolute value of the result will increase. While the results for each calculation will be unaffected by this, it might cause some confusion to a user. Therefore, one non-limiting example to keep intuition correct from one similarity calculation to the next for the user, is to divide each "similarity" result by $\sqrt{N}$, where N is the number of variables in the vector.

Investment advice is then determined by the investment analysis unit 408 based on the results of step S508 and the types of description vectors compared. Provided below are non-limiting examples of investment advice determined by the investment analysis unit 408 based on a variety of financial requests 400 received that relate to investment information. For example, upon receiving a financial request to identify the risk of an investment, the investment analysis system calculates the similarity between the investment risk vector and the benchmark risk vector. For this analysis, the greater the number calculated from the similarity between the investment risk vector and the benchmark risk vector, the higher the risk of the investment.

An investment comparison can also be calculated to provide the user with information on how the current investment compares to an ideal investment. An ideal investment is a predefined investment by the user based on the user's financial requirements. This is determined by calculating the similarity between the investment reward vector and the benchmark reward vector. For this analysis, the smaller the number calculated from the similarity between the investment reward vector and the benchmark reward vector, the closer the current investment is to the ideal investment and therefore the better the current investment.

For a given group of investments, a list of the best and worst investments out of the group can be calculated. This list is determined by calculating the risk and reward for each investment in the database 6. Next, for each investment, the ratio "(1/reward)/(risk)" is calculated and the investments can be ranked by this number. Accordingly, the investments with the highest ranks are the best and the investments with the lowest ranks are the worst. The best or worst investments can be any type of investment meeting predetermined constraints by the user. For example, a best investment could be one which makes the most short term gain whereas the worst investment could be one with the quickest loss short term.

Alternative investments that have a similar risk profile to the current investment can also be calculated. This is analysis is performed by calculating the risk for all the investments in the database 6 and finding those investments with a risk value that is closest to the risk value of the current investment. Similarly, alternative investments that have a similar reward profile to the current investment can also be calculated. This is analysis is performed by calculating the reward for all the investments in the database 6 and finding those investments with a reward value that is closest to the reward value of the current investment.

For a user interested in one investment, better investments with similar risk profiles can be calculated. First, and as explained above, all other investments that have a similar risk profile to the one investment are located from the database 6 and their reward values are calculated. These investments are then ranked by the equation "(1/reward value)/(risk value)" to determine the better investments.

A user can also build a portfolio with an optimal risk/reward. In this case, an optimization routine would find the portfolio that maximized the "(1/reward)/risk" ratio subject to user defined constraints. The user defined constraints can represent certain filters within a portfolio with respect to the investment information. For example, the user could define constraints such that no single investment can have more than a 10% weight in the portfolio, the top 5 investments must account for at least 25% of the total weight in the portfolio, currencies must represent a fraction between 3% and 5% of the portfolio, and gold must represent between 1% and 3% of the portfolio. To define best portfolio, similarity to a benchmark is used for optimization.

In other words, for a portfolio, there would be a weight (wi) for each investment. Each variable that went into either the investment risk vector or the investment reward vector would be weighted by that weight (wi) as follows:

IReward=w1*IRewardV1+w2*IRewardV2+w3*IRewardV3 and so on, with the sum of the w's=1, where each of the IRewardV's is a vector. BReward is set to the user's idea of the ideal investment. IRisk=w1*IRiskV1+w2*IRiskV2+w3*IRiskV3 and so on, while having the same w's as IReward. An optimization routine to maximize (1/∥IReward−BReward∥)/(∥IRisk−BRisk∥) by varying the w's, subject to constraints, would then be used to rank the various investments based on the user constraints.

In another example according to the present advancement, when trying to choose amongst 10 stocks that have been identified via a stock screen or some other associated method, it is important to know which of these stocks gives the most return with respect to the risk. If it is believed that the best stocks have Earnings Growth in the current quarter of 50% to 75%, Annual earnings growth over the last 3 years of 15%-25%, and as close to new highs as possible, the BReward vector is defined as "62.5/normalization (investment variable$_1$), 20/normalization (investment variable$_2$), 0/normalization (investment variable$_3$)." The value 62.5 represents the midpoint of 50 to 75, the value 20 represents the midpoint of 15%-25%, and 0 represents a stock trading at a new high, ie, ((current price−highest price)/current price)/normalization (investment variable$_3$). The same process is then repeated for each of the ten stocks to get their IReward vectors. The ten distances, or similarity values, are then calculated as dReward1 through dReward10 by obtaining the reward similarity values between IReward1 and BReward1, IReward2 and BReward2 and so forth through IReward10 and BReward10.

Similarly, if it is believed that the most worrisome risks are such concerns as the risk that this stock will fall more than 10% in the next week, the probability that this stock will hit a stop loss placed 15% away, and the risk that this stock will fall more than 20% from a purchase price at any time over the next year, the IRisk vector is defined as the normalization of the above noted risk values. Further, the BRisk vector with respect to the Benchmark i.e. the S&P 500 contains the same investment variables 400. Again, the ten distances, or similarity values, are then calculated as dRisk1 through dRisk10 by obtaining the risk similarity values between IRisk1 and BRisk1, IRisk2 and BRisk2 and so forth through IRisk10 and BRisk10.

Next, the ten Reward/Risk statistics are calculated as "(1/Reward Similarity Value[i])/Risk Similarity Value[i]", with i going from 1 to 10. Given the above-noted considerations and based on the results, the highest ranked stock would be the best and the lowest ranked stock would be the worst. For example, the highest ranked stock has the lowest calculated value and the worst stock has the highest calculated value based on the equation: "(1/Reward[i])/Risk[i]."

In another example according to the present advancement, sometimes the user is not worried about risk but is instead interested in the stocks that best match a stock display screen of the user. In other words, the user may be interested in stocks that best match a stock display screen defining that earnings growth must be >60% in the last quarter, sales growth must be >25% in the last quarter, and average annual earnings per share must be >25% over the last 3 years.

A problem with this scenario is that a user will typically just adjust the values displayed on the stock display screen screens until a certain number of stocks come up when no stocks meet the original stock display screen criteria. This causes problems because often the user is looking for a "common-sense" or "close-enough" match to the screen and adjusts the screens, which can move the user away from obtaining a meaningful screen match. In other words, there isn't much of a real difference between a stock that grew at 25% and one that grew at 24.5%. For this case, BReward is defined as (60,25,25).

Next, all the stocks in the database 6 are processed and for each one the IReward is calculated as "min(Earnings Growth, 60), min(Sales Growth,25), min (Average Annual Earnings, 25)." Therefore, criterion that are specified as "must be greater than" or "must be less than" are replaced by any numbers that exceed (are less than) the threshold by the threshold. In other words, if the earnings growth is more than 60, it is replaced with 60. As such, if there are N stocks, N distances N[i] are calculated between BReward[i] and IReward[i]. When the N distances N[i] are ranked in ascending order, the lowest N's have the best match to your criteria. Therefore, the present advancement provides a more useful and reliable stock screen than those provided by conventional methods.

According to another example of the present advancement, assume that a user is a portfolio manager who owns a variety of stocks and has the S&P 500 as a benchmark. Because of this situation, it may seem that the user is massively correlated to the S&P 500 and is a closet indexer. This is a problem because customers may ask why they are paying money for services when it seems like the user is just following the S&P 500. While this may just be a coincidence, there needs to be a way to prove the coincidence to the customer. One solution afforded by the present advancement is to pick a set of salient investment variables 400 such as the P/S ratio, the P/E ratio, average daily trading volume, and market cap relating to a financial request to determine a financial correlation. The weighted average P/S, P/E, average daily trading volume and market cap of the user's portfolio (weighted by their percentage weight in the portfolio) is then calculated based on their values in the database 6 and are compared to the values from the database 6 of the same input variables 400 with respect to the S&P 500. In other words, the BReward and the IReward are calculated and compared. If they're substantially different than zero, then the high correlation to the S&P 500 has nothing to do with being a "closet indexer" and the customer's concerns can be allayed.

According to another example of the present advancement, the user may determine that a particular stock used to be a "value" stock but is now a "growth" stock because the stock has raised in value significantly. As such, the user may have a problem convincing an investment committee to sell the stock unless the user can show that the stock should not be in the user's portfolio.

To solve this issue, a BReward Value and a BReward Growth are calculated by the investment analysis system. Using these calculations, the user can demonstrate that three years ago when the user bought the stock, its BReward Value number was much smaller than its BReward Growth number. However, now the situation is reversed in that the BReward Value is very much larger than BReward Growth. It is important to note in this situation that the BReward Value and BReward Growth vectors need not have the same factors thereby making comparisons very simple for users well versed in the differences between value and growth stocks.

According to another example of the present advancement, assume a user wants to invest in companies local to where the user lives because the user believes he would have a better understanding of information with respect to those local companies from reading local newspapers, talking to local company employees, etc. However, determining which companies are local can be troublesome using conventional methods. A user must struggle with an overwhelming amount of search options to determine whether a company is local such as a company's official address, local revenue, the number of employees that live near the user, the percentage of the company's suppliers that are local, and the percentage of the company's customers that are local. Therefore, unless the user take all these things into account, the user will find it difficult to get useful information with respect to his investment needs.

The use of description vectors of the present advancement overcomes this problem. First, all of the above-noted information with respect to each company is collected and stored in the database 6. For example, the distance of "headquarters" of a company from the geographic center of where the user lives, the percent of the company's employees that work within 25 miles of where the user lives, the percentage of the company's revenue that is generated in the state where the user lives, the amount of the company's supplies that come from company's in the user's state, and the percentage of the company's revenue that comes from other states can be included in an BReward description vector such as BReward (0,100,100,100,100). This value is then compared by the investment analysis system to the IReward of every company in the database 6 using the same variables as those in the BReward description vector to calculate the distances therebetween. Based on the results and the customization and calculation by the investment analysis system, the user is provided with information describing that the lowest distances represent the most "local" companies.

According to another example of the present advancement, the best stocks in the "energy" sector can be calculated by customizing a BRisk and BReward and performing the above-noted procedures for a ranking. If a user is interested in stocks that are "like", or "closest" to Southern Co, the user determines user-customized investment variables 400 such as Debt/Equity, Price/Sales, Quick Ratio, and Market Cap and creates a BReward with these investment variables 400 for Southern Co. These results are then compared by the investment analysis system to all the IRewards in the database 6 and the top N matches can be determined Similarly, if a user is interested in stocks like "RHAT", but wants Risk to be taken into account, the user defines investment variables 400 such as market cap, debt ratios, share numbers, common owners, financial metrics, and similar past performance for Reward (call these x1,x2, x3, . . . xn) and appropriate investment variables (y1, y2, y3 . . . , yn) for Risk. The user then creates a BRisk description vector with y1 through yn and a BReward description vector with x1 through xn. The normal above-noted ranking procedure is then applied to determine the best stocks that are like "RHAT." Further, if the user is interested in stocks that are like "RHAT" but only within the "technology" sector, the investment analysis system follows the above procedure while restricting the stocks in consideration to "technology" stocks.

According to another example of the present advancement, a user may wish to determine whether his mutual fund is exhibiting "style drift" based on the managers investment strategy. Style drift is when a manager has bad performance and changes his method of managing his fund to try to catch up. This is usually a disaster for the investor. To solve this problem, the user takes a portfolio of the fund from a past disclosure and picks the salient investment variables 400 (these will depend on the type of fund). The investment analysis system then determines the old IReward and BReward based on these past investment variables 400 values stored in the database 6 and calculates the distance. The investment analysis system then takes the portfolio of the fund today and makes the same IReward and BReward but with the current values. At this point the investment analysis system can inform the user whether the distance has changed appreciably. The investment analysis tool can also repeat this process for every past quarter to determine whether the distance calculation suddenly spikes up or drifts up every quarter.

According to another example of the present advancement, a user that wants to buy government debt can determine how much riskier that government debt is as compared to other government debt. For example, assume the user wants to buy Italian government debt but believes that German government debt should be taken to be "risk free". The user then wants to know how much riskier the Italian government debt is as compared German government debt. Here, the user determines that the investment variables 400 are "percent of debt maturing in the next year", the "debt/GDP ratio", the "current account deficit as a percent of GDP", and "percentage of debt held by foreigners". The investment analysis system then constructs the BRisk with German statistics and the IRisk with Italian Statistics. The calculated distance measures show how much riskier Italian Debt is versus German Debt.

According to another example of the present advancement, the user may want to buy GE bonds and determine how much riskier the GE bonds are than F bonds? If the user believes that IBM bonds are almost "risk free" and should be used as the benchmark, the user picks salient investment variables 400 and the investment analysis tool constructs IRiskGE, IRiskF and BRiskIBM and compares the distance of IRiskGE versus BRiskIBM with IRiskF versus BRiskIBM. The one with the highest distance is the riskiest.

According to another example of the present advancement, the user may believe that countries with the following set of characteristics (S) have currencies, or stocks, that will appreciate. The investment analysis system can then provide the best investments from a list of countries in the database 6 by generating BReward and IReward and ranking by ascending order of distance.

Referring back to FIG. 5, once the investment advice is returned, it is determined whether there are any additional financial requests at step S512. If YES at step S512, then the process returns to step S500 to receive different investment variables and financial requests 400. If NO at step S512, the analysis process is completed and the process ends.

According to one embodiment of the present advancement, any investment information determined by the analysis investment system is organized and stored virtually in a plurality of folders. For example, analysis results can be stored on a recording medium of a PC or in the database 6 connected to the network 10. A user can then use his computer 2 or connect to the network 10 to obtain previously calculated investment information based on previously customized description vectors.

Websites hosted by servers 4 can also provide users with online access to the features afforded by the analysis investment system. These websites provide general access features to all users as well as increased access and functionality when a user registers with the website. A user who is registered could access old financial investment information based on previously customized description vectors via a search of the virtual folders. This old investment information could then be compared against current values obtained by running the previously customized description vectors. A user can also use customized description vectors to determine investment information based on previous market conditions at a specific date or automatically update the old investment information based on current market conditions.

Though the above discussion has been made with reference to the stock market, other financial markets or investment structures may also be used without departing from the spirit of this advancement.

Any processes, descriptions or blocks in flowcharts described herein should be understood as representing modules, segments, or portions of code which include one or more executable instructions for implementing specific logical functions or steps in the process, and alternate implementations are included within the scope of the exemplary embodiment of the present advancements in which functions may be executed out of order from that shown or discussed, including substantially concurrently or in reverse order depending upon the functionality involved.

Obviously, numerous modifications and variations of the present advancements are possible in light of the above teachings. In particular, while the application of the present advancement has been described with respect to events such as conventions, sports and concerts, other applications are within the scope of the appended claims. For example, without limitation, the present advancement may be applied to video games, TV, cell phones, tablets, web applications, and any other platform as would be understood by one of ordinary skill in the art. It is therefore to be understood that within the scope of the appended claims, the present advancements may be practiced otherwise than as specifically described herein.

The invention claimed is:

1. An information processing apparatus for analyzing investment information, comprising:
   a processor programmed to
      receive a financial request identifying financial information a user wishes to obtain relating to an investment, and one or more different types of investment variables relating to at least one of the investment and a benchmark,
   generate at least two vectors containing the one or more investment variables based on the financial request,
      calculate a similarity value by calculating a distance between the at least two vectors, and
      analyze the similarity value and the financial request, and
      determine output information, as investment advice for a user, correlating to the financial request and the similarity value based on results of the analysis,
   wherein each vector is one of the following types:
   an investment reward vector containing one or more investment variables which the user believes relate to an expected financial return of the investment,
   an investment risk vector containing one or more investment variables which the user believes relate to a level of risk of the investment,
   a benchmark reward vector containing the one or more investment variables which the user believes relate to the expected return of the investment, the one or more variables having values identified by the benchmark, or
   a benchmark risk vector containing the one or more investment variables which the user believes relate to the level of risk of the investment, the one or more variables having values identified by the benchmark.

2. The information processing apparatus of claim 1, wherein the processor is further programmed to normalize the one or more investment variables by converting the one or more investment variables into one or more normalized values each having an equal weight with respect to each other.

3. The information processing apparatus of claim 1, wherein the processor calculates the similarity value by calculating the Euclidean distance between the at least two vectors.

4. The information processing apparatus of claim 1, wherein the financial request is to determine a level of risk of the investment, to determine how the investment compares to an ideal investment received from the user, determine one or more investments having a similar risk profile with respect to the investment, or to analyze a relationship of one or more investments to the benchmark to identify closet indexing.

5. The information processing apparatus of claim 4, wherein the benchmark of the benchmark reward vector and benchmark risk vector relates to a benchmark standard against which the performance of the investment can be measured.

6. The information processing apparatus of claim 1, wherein a type of the at least two vectors generated by the processor is based on the financial request.

7. The information processing apparatus of claim 4, wherein a type of the at least two vectors generated by the processor is based on the financial request.

8. The information processing apparatus of claim 1, wherein in response to receiving a predetermined number of investment variables, the processor divides the similarity value by a function of the number of investment variables.

9. The information processing apparatus of claim 4, wherein when the financial request is to determine a level of risk of the investment, the processor generates an investment risk vector and a benchmark risk vector, calculates the similarity value, and determines the level of risk of the investment based on the similarity value such that the higher the similarity value, the lower the level of risk and the lower the similarity value the higher the level of risk.

10. The information processing apparatus of claim 4, wherein when the financial request is to determine how the investment compares to an ideal investment received from the user,
the processor
receives one or more investment variables which the user believes describe the ideal investment,
generates an investment reward vector containing the one or more investment variables describing the investment and a benchmark reward vector containing the one or more investment variables describing the ideal investment,
calculates the similarity value, and
determines how the investment compares to the ideal investment such that the higher the similarity value, the further the investment is from the ideal investment and the lower the similarity value the closer the investment to the ideal investment.

11. The information processing apparatus of claim 4, wherein when the financial request is to rank a plurality of financial indicators,
the description vector unit generates, for each financial indicator, an investment reward vector, a benchmark reward vector, an investment risk vector, and a benchmark risk vector, each containing one or more investment variables relating to the financial indicator,
the description vector similarity unit calculates, for each financial indicator, a reward similarity value between the investment reward vector and the benchmark reward vector and calculates a risk similarity value between the investment risk vector and the benchmark risk vector, and
the investment analysis unit determines the ranking of the plurality of financial indicators by comparing each reward similarity value and each risk similarity value.

12. The information processing apparatus of claim 11, wherein the investment analysis unit processor determines the ranking of the plurality of financial indicators by calculating and ranking, for each financial indicator, the ratio r, where r=(1/reward similarity value)/(risk similarity value).

13. The information processing apparatus of claim 4, wherein when the financial request is to determine a plurality of financial indicators adhering to predetermined constraints,
the input device receives a plurality of weighting factors, each weighting factor corresponding to a different financial indicator of the plurality of financial indicators;
the description vector unit, for each financial indicator,
generates an investment reward vector, a benchmark reward vector, an investment risk vector, and a benchmark risk vector, each containing one or more investment variables relating to the financial indicator, and
multiplies a corresponding weighting factor to the investment reward vector, benchmark reward vector, investment risk vector, and benchmark risk vector,
the description vector similarity unit calculates, for each financial indicator, a reward similarity value between the investment reward vector and the benchmark reward vector and calculates a risk similarity value between the investment risk vector and the benchmark risk vector, and
the investment analysis unit determines the ranking of the plurality of financial indicators by calculating and ranking, for each financial indicator, the ratio r, where r=(1/reward similarity value)/(risk similarity value).

14. The information processing apparatus of claim 4, further comprising:
a database configured to store a plurality of investments,
wherein when the financial request is to determine one or more investments having a similar risk profile with respect to the investment,
the processor
generates a risk investment vector and a benchmark risk vector containing one or more investment variables relating to the investment, and
generates, for each investment of the plurality of investments, an additional risk investment vector and an additional benchmark risk vector containing one or more investment variables which the user believes relate to the level of risk of the investment,
calculates the similarity value between the risk investment vector and the benchmark risk vector,
for each additional financial indicator of the plurality of additional financial indicators, calculates an additional similarity value by comparing the additional risk investment vector and the additional benchmark risk vector, and
determines one or more investments having a similar risk profile with respect to the investment by comparing the similarity value of the investment to each additional similarity value calculated for each of the plurality of other investments.

15. The information processing apparatus of claim 4, wherein when the financial request is to analyze a relationship of one or more investments to the benchmark to identify closet indexing,
the processor
generates an investment reward vector and a benchmark reward vector containing the one or more investment variables,
calculates the similarity value, and
determines whether closet indexing is taking place based on the similarity value by determining whether the similarity value is greater than a predetermined threshold.

16. A method, implemented by an information processing apparatus, for analyzing investment information, comprising:
receiving, at a processor, a financial request identifying financial information a user wishes to obtain relating to an investment, and one or more different types of investment variables relating to at least one of an investment and a benchmark;
generating, via the processor, at least two vectors containing the one or more investment variables based on the financial request;
calculating, via the processor, a similarity value by calculating a distance between the at least two vectors; and
analyzing, via a processor, the similarity value and the financial request; and
determining, via the processor, output information as investment advice for the user, the output information correlating the financial request and the similarity value based on results of the analysis,
wherein each vector is one of the following types:
an investment reward vector containing one or more investment variables which the user believes relate to an expected financial return of the investment,
an investment risk vector containing one or more investment variables which the user believes relate to a level of risk of the investment, a benchmark reward vector containing the one or more investment variables which the user believes relate to the expected return of the investment, the one or more variables having values identified by the benchmark, or a benchmark risk vector containing the one or more investment variables which the user believes relate to the level of risk of the investment, the one or more variables having values identified by the benchmark.

17. The method of claim 16, wherein the financial request is to determine a level of risk of the investment, to determine how the investment compares to an ideal investment received from the user, to determine one or more investments having a similar risk profile with respect to the investment, or to analyze a relationship of one or more investments to the benchmark to identify closet indexing.

18. A non-transitory computer-readable medium storing computer-readable instructions thereon which when executed by a computer cause the computer to perform a method for analyzing investment information, comprising:

receiving a financial request identifying financial information a user wishes to obtain relating to an investment and one or more different types of investment variables relating to at least one of an investment and a benchmark;

generating at least two vectors containing the one or more investment variables based on the financial request;

calculating a similarity value by calculating a distance between the at least two vectors;

analyzing the similarity value and the financial request; and determining output information as investment advice for the user, the output information correlating the financial request and the similarity value based on results of the analysis, wherein each vector is one of the following types:

an investment reward vector containing one or more investment variables which the user believes relate to an expected financial return of the investment, an investment risk vector containing one or more investment variables which the user believes relate to a level of risk of the investment, a benchmark reward vector containing the one or more investment variables which the user believes relate to the expected return of the investment, the one or more variables having values identified by the benchmark, or a benchmark risk vector containing the one or more investment variables which the user believes relate to the level of risk of the investment, the one or more variables having values identified by the benchmark.

* * * * *